(12) United States Patent
Wu et al.

(10) Patent No.: US 10,116,529 B2
(45) Date of Patent: Oct. 30, 2018

(54) METHOD AND DEVICE FOR LINK ADDRESS UPDATE

(71) Applicant: BEIJING GRIDSUM TECHNOLOGY CO., LTD., Beijing (CN)

(72) Inventors: Chong Wu, Beijing (CN); Yun Zhang, Beijing (CN); Lei Chi, Beijing (CN); Huagui Lai, Beijing (CN); Yongjian Huang, Beijing (CN)

(73) Assignee: BEIJING GRIDSUM TECHNOLOGY CO., LTD., Beijing (CN)

( * ) Notice: Subject to any disclaimer, the term of this patent is extended or adjusted under 35 U.S.C. 154(b) by 240 days.

(21) Appl. No.: 15/162,345

(22) Filed: May 23, 2016

(65) Prior Publication Data

US 2016/0269253 A1    Sep. 15, 2016

Related U.S. Application Data

(63) Continuation-in-part of application No. 14/907,191, filed as application No. PCT/CN2014/082647 on Jul. 21, 2014.

(30) Foreign Application Priority Data

Jul. 22, 2013   (CN) .......................... 2013 1 0308933

(51) Int. Cl.
*G06F 17/00*    (2006.01)
*H04L 12/26*    (2006.01)
(Continued)

(52) U.S. Cl.
CPC ........ *H04L 43/04* (2013.01); *G06F 17/30882* (2013.01); *H04L 43/08* (2013.01); *H04L 67/02* (2013.01); *H04L 67/22* (2013.01)

(58) Field of Classification Search
CPC ... G06F 17/30882; G06F 17/30; H04L 43/04; H04L 43/08
(Continued)

(56) References Cited

U.S. PATENT DOCUMENTS

2004/0205503 A1\* 10/2004 Gutta ................ G06F 17/30014
715/206
2013/0080498 A1    3/2013 DeSilva et al.

FOREIGN PATENT DOCUMENTS

CN    101304320       11/2008
CN    101432728 A      5/2009
(Continued)

OTHER PUBLICATIONS

International Search Report for PCT/CN2014/082647 dated Nov. 3, 2014.
(Continued)

*Primary Examiner* — Isaac M Woo
(74) *Attorney, Agent, or Firm* — McAndrews, Held & Malloy, Ltd.

(57) ABSTRACT

The disclosure discloses a link address updating method and device. The link address updating method includes: acquiring tracking parameter information, wherein the tracking parameter information is parameter information of a first link address, and is configured to track a first link address; acquiring the first link address; and generating a second link address according to the tracking parameter information and the first link address, the second link address is a link address obtained after a tracking parameter of the first link address is added or modified and both the first link address and the second link address being link addresses of the same webpage. By the disclosure, a link address may be automatically updated.

10 Claims, 4 Drawing Sheets

(51) Int. Cl.
*G06F 17/30* (2006.01)
*H04L 29/08* (2006.01)

(58) Field of Classification Search
USPC .................................................. 707/600–899
See application file for complete search history.

(56) References Cited

FOREIGN PATENT DOCUMENTS

| | | |
|---|---|---|
| CN | 101699431 | 4/2010 |
| CN | 102663049 A | 9/2012 |
| CN | 103220371 | 7/2013 |
| CN | 103390048 | 11/2013 |
| JP | 2007195057 | 8/2007 |

OTHER PUBLICATIONS

SIPO Search Report dated Nov. 24, 2015 corresponding to CN Application No. CN 2013103089332.

* cited by examiner

METHOD AND DEVICE FOR LINK ADDRESS UPDATE

CROSS-REFERENCE TO RELATED APPLICATIONS/INCORPORATION BY REFERENCE

This application is a continuation-in-part of U.S. patent application Ser. No. 14/907,191, filed on Jan. 22, 2016, 371 of International Patent Application No. PCT/CN2014/082647, filed Jul. 21, 2014, which claims priority to Chinese Patent Application No. 201310308933.2, filed Jul. 22, 2013. The above-identified applications are hereby incorporated herein by reference in their entirety.

TECHNICAL FIELD OF THE DISCLOSURE

The disclosure relates to the field of Internet, and in particular to a link address updating method and device.

BACKGROUND OF THE DISCLOSURE

When an advertiser delivers an advertisement, it is necessary to set a link address of the advertisement. Many tracking parameters such as trackid1=value1&trackid2=value2 . . . are usually required to be added to a link address for key performance indicator tracking. Different tracking parameters are usually adopted for different advertisement materials which are delivered, and excel macro or other tools are usually adopted to generate parameters in batches when there are many advertisement materials to be delivered, which may cause many problems.

1. Using excel macro and the other tools may solve the problem of address generation at one time, but may not implement automatic updating of a link address of an advertisement which has been delivered when a parameter strategy is changed later.

2. A parameter of a link address of an advertisement may not be automatically checked whether to be correctly set or not.

For the problem of incapability of automatically updating a link address when link parameter information is changed in an existing technology, there is yet no effective solution.

SUMMARY OF THE DISCLOSURE

A main purpose of the disclosure is to provide a link address updating method and device, so as to solve the problem of incapability of automatically updating a link address when link parameter information is changed.

In order to achieve the purpose, according to one aspect of the disclosure, a link address updating method is provided.

The link address updating method according to the disclosure includes: acquiring tracking parameter information, wherein the tracking parameter information is parameter information of a first link address, and is configured to track the first link address; acquiring the first link address; and generating a second link address according to the tracking parameter information and the first link address, the second link address is a link address obtained after a tracking parameter of the first link address is added or modified, wherein both the first link address and the second link address are link addresses of the same webpage.

Furthermore, a value of the tracking parameter is a fixed constant or a variable represented by a wildcard, wherein generating the second link address according to the tracking parameter information and the first link address includes: generating the second link address according to the fixed constant and the first link address, or, generating the second link address according to the variable represented by the wildcard and the first link address.

Furthermore, generating the second link address according to the tracking parameter information and the first link address includes: adding the tracking parameter information to the first link address, wherein adding the tracking parameter information to the first link address includes: judging whether the value of the tracking parameter is the fixed constant or not; adding the fixed constant to the first link address if the value of the tracking parameter is the fixed constant; and if the value of the tracking parameter is the variable represented by the wildcard, converting the variable represented by the wildcard into a corresponding value of the variable, and adding the value of the variable to the first link address.

Furthermore, before generating the second link address according to the tracking parameter information and the first link address, the method further includes: detecting whether the first link address enables the tracking parameter information or not; if the first link address enables the tracking parameter information, searching for whether a parent of the first link address has tracking parameter information or not, wherein searching for whether the parent of the first link address has the tracking parameter information or not includes: performing first checking processing on the first link address if the parent of the first link address has the tracking parameter information, first checking processing being marking the existing parameter information in the first link address, and performing second checking processing on a searched first link address content if the parent of the first link address does not have the tracking parameter information; and if the first link address does not enable the tracking parameter information, performing second checking on a detected first link address content, and recording a checking result.

Furthermore, performing second checking processing on the searched first link address content includes: if the searched first link address content is the same as a first link address content, recording the checking result; and if the searched first link address content is different from the first link address content, rechecking whether the first link address enables the tracking parameter information or not.

Furthermore, the tracking parameter information of the first link address is added or modified to obtain the second link address after first checking processing of the first link address.

Furthermore, whether the first link address enables the tracking parameter information or not is rechecked if the tracking parameter information or the first link address is changed, wherein the tracking parameter information of the parent is searched if the tracking parameter information is enabled, and second checking is performed on the first link address content if the tracking parameter information is not enabled.

Furthermore, link address checking is performed on the second link address after the second link address is generated according to the tracking parameter information and the first link address, wherein link address checking is performed on the second link address in a manner of: checking whether a tracking parameter of the second link address is completed or not, checking whether a value of the second link address is correct or not and checking whether a length of the second link address is excessive or not; if the tracking parameter of the second link address is not completed, the value of the second link address is incorrect or the length of the second link address is excessive, whether the first link address enables the tracking parameter information or not is rechecked; and if the tracking parameter of the second link address has been completed, the value of the second link address is correct and the length of the second link address is not excessive, a checking result is recorded.

In order to achieve the purpose, according to one aspect of the disclosure, a link address updating device is provided.

The link address updating device according to the disclosure includes: a first acquisition module, configured to acquire tracking parameter information, wherein the tracking parameter information is parameter information of a first link address, and is configured to track the first link address; a second acquisition module, configured to acquire the first link address; and a generation module, configured to generate a second link address according to the tracking parameter information and the first link address, the second link address is a link address obtained after a tracking parameter of the first link address is added or modified, wherein both the first link address and the second link address are link addresses of the same webpage.

Furthermore, a value of the tracking parameter is a fixed constant or a variable represented by a wildcard, wherein the generation module is configured to generate the second link address according to the tracking parameter information and the first link address in a manner of: generating the second link address according to the fixed constant and the first link address, or, generating the second link address according to the variable represented by the wildcard and the first link address.

Furthermore, the generation module is configured to generate the second link address according to the tracking parameter information and the first link address by adding the tracking parameter information to the first link address, and the generation module includes: a judgment sub-module, configured to judge whether the value of the tracking parameter is the fixed constant or not; a first addition sub-module, configured to add the fixed constant to the first link address if the value of the tracking parameter is the fixed constant; and a second addition sub-module, configured to, if the value of the tracking parameter is the variable represented by the wildcard, convert the variable represented by the wildcard into a corresponding value of the variable, and add the value of the variable to the first link address.

Furthermore, the link address updating device further includes: a detection module, configured to detect whether the first link address enables the tracking parameter information or not before the second link address is generated according to the tracking parameter information and the first link address; a searching module, configured to, if the first link address enables the tracking parameter information, search for whether a parent of the first link address has tracking parameter information or not, wherein searching for whether the parent of the first link address has the tracking parameter information or not includes: performing first checking processing on the first link address if the parent of the first link address has the tracking parameter information, first checking processing being marking the existing parameter information in the first link address, and performing second checking processing on a searched first link address content if the parent of the first link address does not have the tracking parameter information; and a checking module, configured to, if the first link address does not enable the tracking parameter information, perform second checking on a detected first link address content, and record a checking result.

Furthermore, the checking module is configured to perform second checking processing on the searched first link address content in a manner of: if the searched first link address content is the same as a first link address content, recording the checking result; and if the searched first link address content is different from the first link address content, rechecking whether the first link address enables the tracking parameter information or not.

Furthermore, the generation module is configured to add or modify the tracking parameter information of the first link address to obtain the second link address after first checking processing of the first link address.

Furthermore, whether the first link address enables the tracking parameter information or not is rechecked if the tracking parameter information or the first link address is changed, wherein the tracking parameter information of the parent is searched if the tracking parameter information is enabled, and second checking is performed on the first link address content if the tracking parameter information is not enabled.

Furthermore, the link address updating device further includes: a checking module, configured to perform link address checking on the second link address after the second link address is generated according to the tracking parameter information and the first link address, wherein link address checking is performed on the second link address in a manner of: checking whether a tracking parameter of the second link address is completed or not, checking whether a value of the second link address is correct or not and checking whether a length of the second link address is excessive or not; if the tracking parameter of the second link address is not completed, the value of the second link address is incorrect or the length of the second link address is excessive, whether the first link address enables the tracking parameter information or not is rechecked; and if the tracking parameter of the second link address has been completed, the value of the second link address is correct and the length of the second link address is not excessive, a checking result is recorded.

According to the disclosure, a link address tracking parameter management method is adopted, so that the problem of incapability of automatically updating the link address when the parameter information of the link address is changed is solved, and the effect of automatically updating the link address is further achieved.

BRIEF DESCRIPTION OF THE DRAWINGS

The drawings, which form a part of the disclosure, are adopted to provide further understanding of the disclosure. Schematic embodiments of the disclosure and description thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments can be combined under the condition of no conflicts. The disclosure will be described below with reference to the drawings and the embodiments in detail.

In order to make those skilled in the art better understand the solutions of the disclosure, the technical solutions in the embodiments of the disclosure will be clearly and completely described below with reference to the drawings in the embodiments of the disclosure. Obviously, the described embodiments are not all embodiments but only part of embodiments of the disclosure. All the other embodiments implemented based on the embodiments in the disclosure by those skilled in the art on the premise of no creative work shall fall within the scope of protection of the disclosure.

Figure 1:
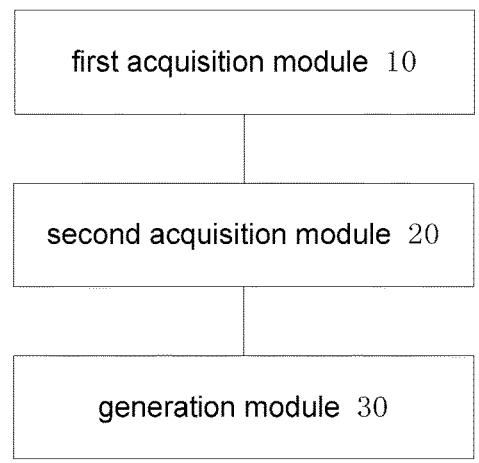
FIG. 1 is a schematic diagram of a link address updating device according to a first embodiment of the disclosure.

FIG. 1 is a schematic diagram of a link address updating device according to a first embodiment of the disclosure. The device includes a first acquisition module 10, a second acquisition module 20 and a generation module 30.

The first acquisition module 10 is configured to acquire tracking parameter information, wherein the tracking parameter information is parameter information of a first link address, and is configured to track the first link address.

The first link address is a webpage address, and includes a reference link address, and the reference link address does not include any tracking parameter, such as www.baidu.com. The first link address may not include a tracking parameter, and may also include the tracking parameter, besides the reference link address. If the first link address includes the tracking parameter, one tracking parameter may be included, such as trackid1=value1, and multiple tracking parameters may also be included, such as trackid1=value1&trackid2=value2 . . . .

The tracking parameter information is the parameter information configured to track the first link address in the first link address. A keyword corresponding to the first link address may be tracked through the tracking parameter information in the first link address. The keyword is a bottom-level packet in an architecture of a Search Engine Marketing (SEM) system, the architecture of the SEM system usually includes multiple levels, each level includes multiple packets in a treelike structure, and for example, a certain SEM system includes multiple accounts, each account includes multiple popularization plans, each popularization plan includes multiple popularization units, and each popularization unit includes multiple keywords.

Specifically, that the keyword corresponding to the first link address may be tracked through the tracking parameter information in the first link address may refer to search a position of the keyword in the treelike structure of the SEM system. For example, if tracking parameter information of a certain first link address includes position information of a keyword "certain digital camera" corresponding to the first link address in the architecture of the SEM system, and parents of each level of the keyword "certain digital camera" corresponding to the first link address are sequentially "digital product"-"11.11 discount"-"certain account"-"Baidu" from a bottom level to a higher level respectively.

The first acquisition module 10 may acquire the tracking parameter information in a manner of acquiring the tracking parameter information according to the first link address, and for example, if the first acquisition module 10 finding the tracking parameter information in the first link address, the first acquisition module 10 may modify the tracking parameter information found in the first link address and determine the modified tracking parameter information as new tracking parameter information, or may add the modified tracking parameter information to the original tracking parameter information to generate the new tracking parameter information; the first acquisition module 10 may also acquire the tracking parameter information in a manner of generating the tracking parameter information according to an advertisement or keyword corresponding to the first link address, and for example, the keyword corresponding to the first link address is KEY, and the first acquisition module 10 may generate tracking parameter information such as trackid1=KEY; and the first acquisition module 10 may further acquire the tracking parameter information in a manner of generating the tracking parameter information according to a parent of the advertisement or keyword corresponding to the first link address, and for example, a material attribute of the advertisement corresponding to the first link address is red, and the first acquisition module 10 acquires tracking parameter information such as trackid3-red. A source from which the first acquisition module 10 acquires the tracking parameter information and a forming rule of the tracking parameter information may depend on a specific condition, and a specific form of the tracking parameter information and a specific manner for acquiring the tracking parameter information are not limited in the disclosure.

The tracking parameter information may be a series of key-value pairs, a value of each tracking parameter may be a fixed constant, and may also be a variable represented by a wildcard, and the tracking parameter information may be set to implement link address tracking according to a certain rule.

The link address includes much address information, and the address information of the link address may be link address information of a webpage, may also be link address information of an advertisement, and may further be another link address with a link address tracking requirement. For example: information such as trackid1=value1&trackid2=value2 . . . may be added to the link address for key performance indicator tracking, and these information is the tracking parameter. Different tracking parameters may be adopted for different material information in a webpage or an advertisement. But these link addresses including different tracking parameters may point to the same webpage.

The first link address may be a link address of any webpage or advertisement.

The second acquisition module 20 is configured to acquire the first link address. The first link address acquired by the second acquisition module 20 may be an reference link address of any webpage, such as www.baidu.com, and may also be any webpage link address with a tracking parameter, such as www.baidu.com/trackid1=value1.

The generation module 30 is configured to generate a second link address according to the tracking parameter information and the first link address, the second link address is a link address obtained after a tracking parameter of the first link address is added or modified, wherein both the first link address and the second link address are link addresses of the same webpage.

The second link address is the link address obtained after the tracking parameter of the first link address is added or modified, for example, the acquired first link address is www.baidu.com/trackid1=value1, the tracking parameter information in the first link address is modified to acquire modified tracking parameter information trackid2=value2, and the second link address generated according to the tracking parameter information and the first link address may be www.baidu.com/trackid1=value1&trackid2=value2 generated by adding the acquired tracking parameter to the first link address, and may also be www.baidu.com/trackid2=value2 generated by directly modifying the tracking parameter of the first link address.

It is important to note that the generated second link address is different from the first link address, but the first link address and the second link address may correspond to the same webpage, and the webpage may refer to a webpage corresponding to a certain advertisement material.

According to the link address updating device of the embodiment of the disclosure, when the value of the tracking parameter is the fixed constant or the variable represented by the wildcard, the generation module is configured to generate the second link address according to the tracking parameter information and a reference link address of the first link address in a manner of: generating the second link address according to the fixed constant and the first link address, or generating the second link address according to the variable represented by the wildcard and the first link address.

Figure 2:
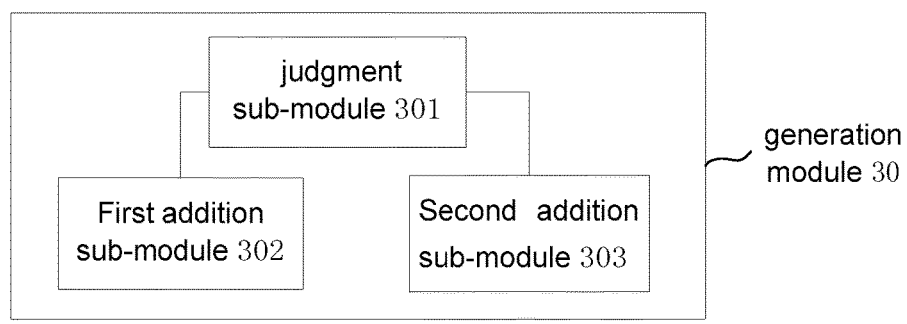
FIG. 2 is a schematic diagram of a link address updating device according to a second embodiment of the disclosure.

FIG. 2 is a schematic diagram of a link address updating device according to a second embodiment of the disclosure. The generation module 30 of the link address updating device further includes a judgment sub-module 301, a first addition sub-module 302 and a third addition sub-module 303.

The judgment sub-module 301 is configured to judge whether the value of the tracking parameter is the fixed constant or not. The value of the tracking parameter may be the fixed constant, and may also be the variable represented by the wildcard. When the value of the tracking parameter is the fixed constant, the judgment sub-module 301 determines that the value of the tracking parameter is the fixed constant, and when the value of the tracking parameter is the variable represented by the wildcard, the judgment sub-module 301 determines that the value of the tracking parameter is the variable.

The first addition sub-module 302 is configured to add the fixed constant to the first link address if it is determined that the value of the tracking parameter is the fixed constant. For example, if it is determined that the value of the tracking parameter is a fixed constant C and the first link address is www.baidu.com, the generated second link address is www.baidu.com/tracid2=C.

The second addition sub-module 303 is configured to, if it is determined that the value of the tracking parameter is the variable represented by the wildcard, convert the variable represented by the wildcard into a corresponding value of the variable, and add the value of the variable to the first link address.

For example, if the judgment sub-module 301 determines that the value of the tracking parameter is a variable value1 represented by a wildcard and a value of the variable value1 is 5, the value of the variable is added to the first link address www.baidu.com to generate the second link address www.baidu.com/trackid1=5.

Figure 3:
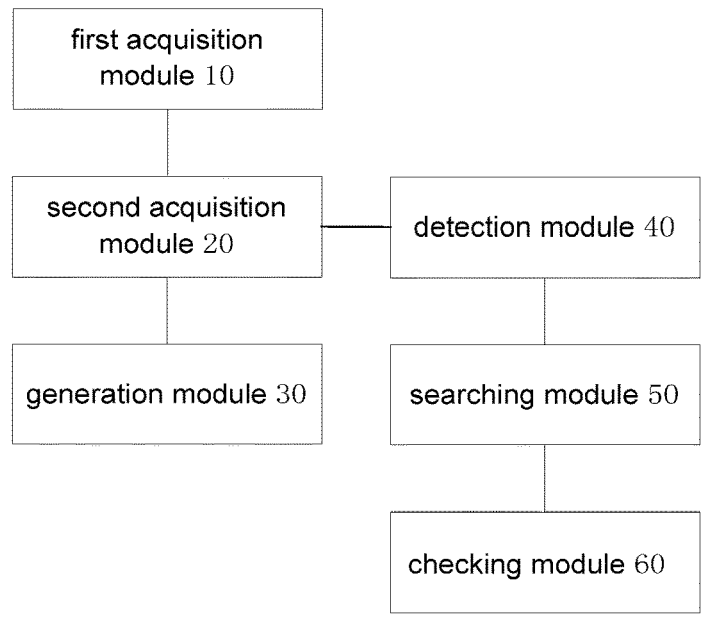
FIG. 3 is a schematic diagram of a link address updating device according to a third embodiment of the disclosure.

FIG. 3 is a schematic diagram of a link address updating device according to a third embodiment of the disclosure. The device includes a first acquisition module 10, a second acquisition module 20, a generation module 30 and a detection module 40.

Functions of the first acquisition module 10, the second acquisition module 20 and the generation module 30 are the same as those of the first acquisition module 10, second acquisition module 20 and generation module 30 in the embodiment shown in FIG. 1, and will not be repeated here.

The detection module 40 is configured to detect whether a first link address enables tracking parameter information or not before a second link address is generated according to the tracking parameter information and the first link address. For example, whether the first link address needs to enable the tracking parameter information or not is detected when the tracking parameter information or reference link address information of the first link address is changed.

A searching module 50 is configured to, if the detection module 40 detects that the first link address enables the tracking parameter information, search for whether a parent of a keyword corresponding to the first link address has tracking parameter information or not. Existing parameter information in the first link address may be a reference link address such as www.baidu.com, and may also be an address with tracking parameter information, such as www.baidu.com/trackid1=5. Searching for whether the parent of the first link address has the tracking parameter information or not includes: performing first checking processing on the first link address if the parent of the first link address has the tracking parameter information, wherein first checking processing is marking the existing parameter information in the first link address; and performing second checking processing on a searched first link address content if the parent of the first link address does not have the tracking parameter information, wherein the parent of the keyword or advertisement material corresponding to the first link address may be a unit, a plan, a solution, an account and the like. Second checking processing is checking processing executed on the searched first link address content. Second checking processing includes: recording a checking result if the searched first link address content is the same as a first link address content; rechecking whether the first link address enables the tracking parameter information or not if the searched first link address content is different from the first link address content. If the searched first link address content is different from the first link address content, an abnormity occurs, and thus, whether the first link address enables the tracking parameter information or not is required to be rechecked.

For the condition that the first link address enables the tracking parameter information, specific parameters added to the first link address may be self-defined and configured in advance, so that there may exist the condition that the first link address enables the tracking parameter information while the parent of the first link address does not have the tracking parameter information.

Specifically, searching for whether the parent of the first link address has the tracking parameter information or not may refer to searching for whether the parent of the keyword or advertisement material corresponding to the first link address has the tracking parameter information or not. The parent of the keyword or advertisement material corresponding to the first link address may refer to an upper-level packet of a type of the keyword or an attribute of the advertisement material, and the parent of the keyword or the advertisement material may include a parent of a level, and may also include parents of multiple levels. The tracking parameter information of the parent of the keyword or advertisement material corresponding to the first link address is configured to track a position of the parent of the keyword or the advertisement material in an architecture of an SEM system.

That the parent of the keyword corresponding to the first link address has the tracking parameter information refers to that the tracking parameter information in the first link address includes the tracking parameter information of the parent of the keyword, and the parent of the keyword or the advertisement material includes an upper-level parent, a parent of a certain level or the parents of each level.

For example, if the keyword corresponding to the first link address is "certain digital camera", the upper-level parent of the keyword is "digital product" and the first link address is www.baidu.com/trackid1=certain digital camera&trackid2=digital product, the upper-level parent of the first link address has tracking parameter information. Definition about whether any level of parent of the keyword has tracking parameter information or not is the same, and will not be enumerated one by one.

If the parent of the first link address has the tracking parameter information, the existing parameter information in the first link address is marked. Marking the existing tracking parameter information is favorable for rapidly determining a position where a tracking parameter is added or the tracking parameter is modified in the first link address. Marking operation may mark the existing tracking parameter information of each level of parent of the keyword in the first link address to facilitate modification of the tracking parameter information of the parent of a certain level or addition of the tracking parameter information at a certain position.

A checking module 60 is configured to, if it is detected that the first link address does not enable the tracking parameter information, perform second checking on a detected first link address content, and record a checking result. Second checking includes checking executed on the detected first link address content, and specifically, second checking may be checking whether the detected first link address content is the same as the original first link address content or not.

The checking module 60 is further configured to perform link address checking on the second link address after the second link address is generated according to the tracking parameter information and the first link address, wherein link address checking is performed on the second link address in a manner of: checking whether a tracking parameter of the second link address is completed or not, the tracking parameter information being configured to track position information of a keyword in the architecture of the SEM system, the position information of the keyword including information of a parent of each level of the keyword and checking whether the tracking parameter of the second link address is completed or not being checking whether the information of the parent of each level of the keyword in the second link address is completed or not; checking whether a value of the second link address is correct or not; checking whether a length of the second link address is excessive or not; if the tracking parameter of the second link address is not completed, the value of the second link address is incorrect or the length of the second link address is excessive, whether the first link address enables the tracking parameter information or not is rechecked; and if the tracking parameter of the second link address has been completed, the value of the second link address is correct and the length of the second link address is not excessive, a checking result is recorded.

The tracking parameter information of the first link address is added or modified to generate the second link address by virtue of the generation module after first checking processing of the first link address.

Whether the first link address enables the tracking parameter information or not is rechecked if the tracking parameter information or the first link address is changed, wherein the tracking parameter information of the parent is searched if the tracking parameter information is enabled, and second checking is performed on the first link address content if the tracking parameter information is not enabled.

Figure 4:
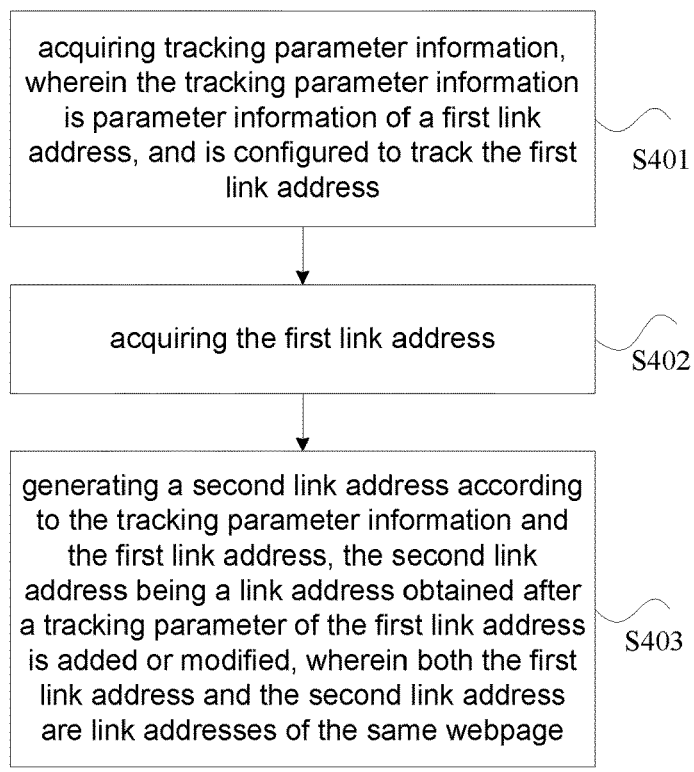
FIG. 4 is a flowchart of a link address updating method according to an embodiment of the disclosure.

FIG. 4 is a flowchart of a link address updating method according to an embodiment of the disclosure. The link address updating method according to the embodiment of the disclosure includes the following Step 401 to Step 403.

Step 401: acquiring tracking parameter information, wherein the tracking parameter information is parameter information of a first link address, and is configured to track the first link address.

The link address includes much address information, and a tracking parameter such as trackid1=value1&trackid2=value2 . . . may be added to the link address for key performance indicator tracking. Different tracking parameters may be adopted for different material information in a webpage or an advertisement.

The tracking parameter information may be a series of key-value pairs, a value of each tracking parameter may be a fixed constant, and may also be a variable represented by a wildcard, and then a set of tracking parameter setting rules, i.e. the tracking parameter information is formed.

The first link address may be a link address of any webpage or advertisement.

The parameter value of the tracking parameter may be a certain related attribute of a material, for example: a unit name, a plan name, a solution name and an account name. Specifically, the material may be an advertisement material, such as a keyword, a flash, a picture and a text link. Since the related attribute of the material is directly related to material information, setting the related attribute of the material as the parameter value of the tracking parameter may bring more convenience to management of the tracking parameter.

The tracking parameter information may be applied to any link, a preset link is tracked according to the tracking parameter information, and in such a manner, when the material information is changed, a link address is changed according to the tracking parameter information corresponding to the material information, thereby fulfilling the aim of tracking the link.

Step 402: acquiring the first link address. The first link address may be a link address of a webpage to which a parameter is required to be added, and may also be a reference link address of an advertisement, and the parameter is added on the basis of the acquired first link address to obtain a trackable link address added with the parameter.

The acquired first link address may be an reference link address of any webpage, such as www.baidu.com, and may also be any webpage link address with a tracking parameter, such as www.baidu.com/trackid1=value1.

Step 403: generating a second link address according to the tracking parameter information and the first link address, the second link address is a link address obtained after a tracking parameter of the first link address is added or modified and both the first link address and the second link address being link addresses of the same webpage.

The second link address is the link address obtained after the tracking parameter of the first link address is added or modified. For example, the acquired first link address is www.baidu.com/trackid1=value1, the tracking parameter information is trackid2=value2, and the second link address generated according to the tracking parameter information and the first link address may be www.baidu.com/trackid1=value1&trackid2=value2 generated by adding the tracking parameter to the first link address, and may also be www.baidu.com/trackid2=value2 by modifying the tracking parameter of the first link address.

When the tracking parameter is required to be added to the first link address, the tracking parameter is added to the first link address to obtain the second link address according to the first link address and the tracking parameter; and when the tracking parameter information is changed, an original tracking parameter of the first link address is modified into a new tracking parameter to obtain the second link address. When the tracking parameter of the first link address is added or modified, a webpage content corresponding to the first link address is kept unchanged.

The tracking parameter information of the first link address is added or modified to form the second link address with a tracking parameter during link address updating, so that the link address to be tracked may be searched by searching for the tracking parameter in the second link address. In such a manner, the aim of tracking the link address is fulfilled, a requirement on searching for all contents of the link address when the link address is searched is also eliminated, a tracking searching procedure is simplified, and workload in tracking searching is reduced.

In order to make the technical solutions of the disclosure clearer, addition of the parameter to the link address is described below with an advertisement link address as an example in detail. It should be understood that the specific embodiment described here is only adopted to explain the disclosure and not intended to limit the disclosure.

According to the link address updating method of the embodiment of the disclosure, when the value of the tracking parameter is the fixed constant or the variable represented by the wildcard, the second link address is generated according to the tracking parameter information and the reference link address of the first link address, including: generating the second link address according to the fixed constant and the first link address, or generating the second link address according to the variable represented by the wildcard and the first link address.

Figure 5:
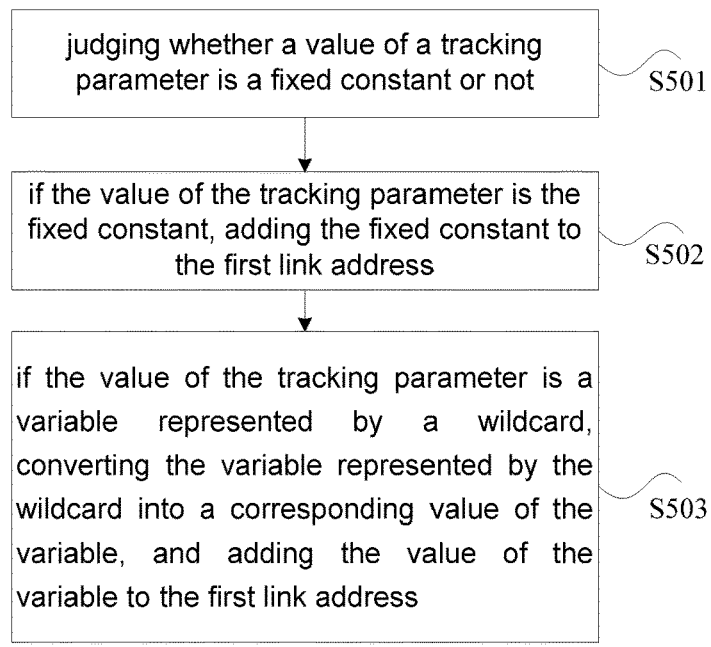
FIG. 5 is a flowchart of parameter addition in a link address updating method according to an embodiment of the disclosure.

FIG. 5 is a flowchart of parameter addition in a link address updating method according to an embodiment of the disclosure. Parameter addition in the link address updating method includes the following steps:

Step 501: judging whether the value of the tracking parameter is the fixed constant or not, wherein the value of the tracking parameter may be the fixed constant, and may also be the variable represented by the wildcard;

Step 502: if the value of the tracking parameter is the fixed constant, adding the fixed constant to the first link address, wherein, for example, if the fixed constant is C and the first link address is www.baidu.com, the generated second link address is www.baidu.com/trackid2=C; and Step 503: if the value of the tracking parameter is the variable represented by the wildcard, converting the variable represented by the wildcard into a corresponding value of the variable, and adding the value of the variable to the first link address.

For example, if the variable represented by the wildcard is value1, and the value of the variable value1 is 5, the value of the variable is added to the first link address www.baidu.com to generate the second link address www.baidu.com/trackid1=5.

Figure 6:
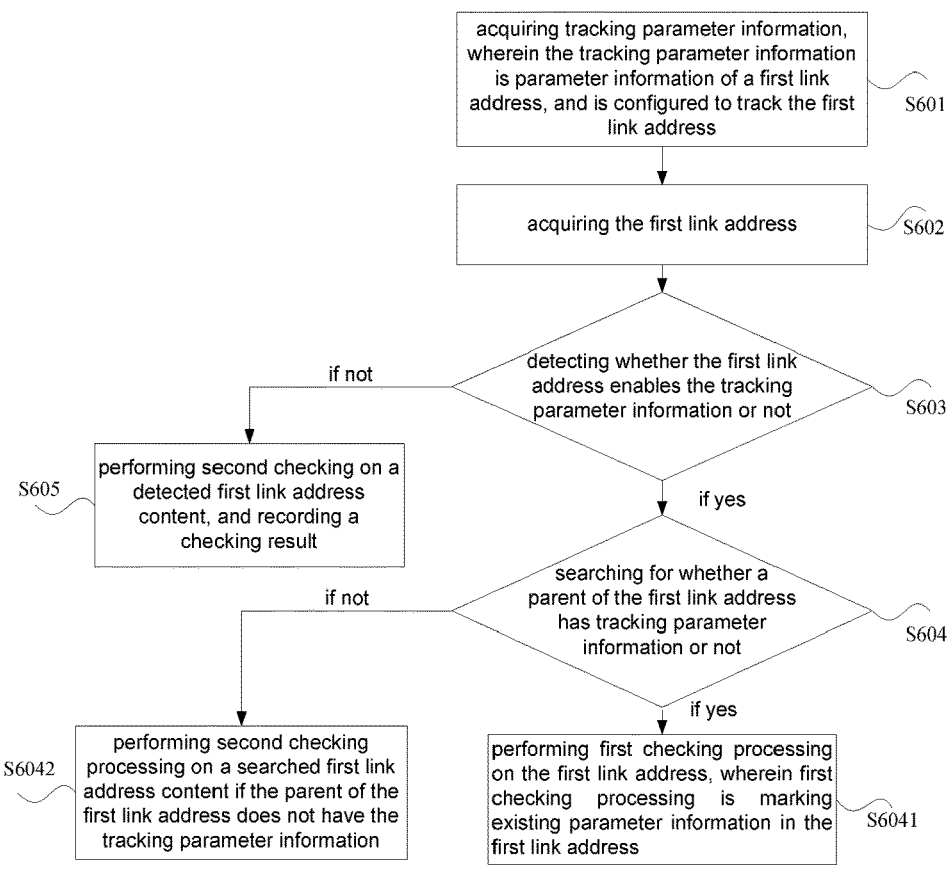
FIG. 6 is a flowchart of a link address updating method according to another embodiment of the disclosure.

FIG. 6 is a flowchart of a link address updating method according to another embodiment of the disclosure. The link address updating method according to the embodiment includes the following steps.

Step 601 to Step 602 are the same as Step 401 and Step 402 in the embodiment shown in FIG. 4, and will not be repeated here.

Step 603: detecting whether the first link address enables the tracking parameter information or not before the second link address is generated according to the tracking parameter information and the first link address. For example, when the tracking parameter information and the address information of the first link address is changed, whether the first link address enables the tracking parameter information or not is detected.

Step 604: searching for whether a parent of the first link address has tracking parameter information or not when the first link address enables the tracking parameter information, wherein searching for whether the parent of the first link address has the tracking parameter information or not includes:

Step 6041: performing first checking processing on the first link address if the parent of the first link address has the tracking parameter information, wherein first checking processing is marking the existing parameter information in the first link address, and the existing parameter information in the first link address may be an address such as www.baidu.com, and may also be an address with a tracking parameter such as www.baidu.com/trackid1=5; and Step 6042: performing second checking processing on a searched first link address content if the parent of the first link address does not have the tracking parameter information, wherein the parent of the first link address may be a unit, a plan, a solution, an account and the like; second checking processing is checking processing executed on a searched first link address content; second checking processing includes: recording a checking result if the searched first link address content is the same as a first link address content; and rechecking whether the first link address enables the tracking parameter information or not if the searched first link address content is different from the first link address content.

Step 605: if the first link address does not enable the tracking parameter information, performing second checking on a detected first link address content, and recording a checking result, wherein second checking is checking executed on the detected first link address content, and specifically, second checking may be checking whether the detected first link address content is the same as the original first link address content or not.

Link address checking is performed on the second link address after the second link address is generated according to the tracking parameter information and the first link address, wherein link address checking is performed on the second link address in a manner of: checking whether the tracking parameter of the second link address is completed or not, checking whether a value of the second link address is correct or not and checking whether a length of the second link address is excessive or not; if the tracking parameter of the second link address is not completed, the value of the second link address is incorrect or the length of the second link address is excessive, whether the first link address enables the tracking parameter information or not is rechecked; and if the tracking parameter of the second link address has been completed, the value of the second link address is correct and the length of the second link address is not excessive, a checking result is recorded.

The tracking parameter information of the first link address is added or modified to generate the second link address by virtue of the generation module after first checking processing of the first link address.

Whether the first link address enables the tracking parameter information or not is rechecked if the tracking parameter information or the first link address is changed, wherein the tracking parameter information of the parent is searched if the tracking parameter information is enabled, and second checking is performed on the first link address content if the tracking parameter information is not enabled.

Figure 7:
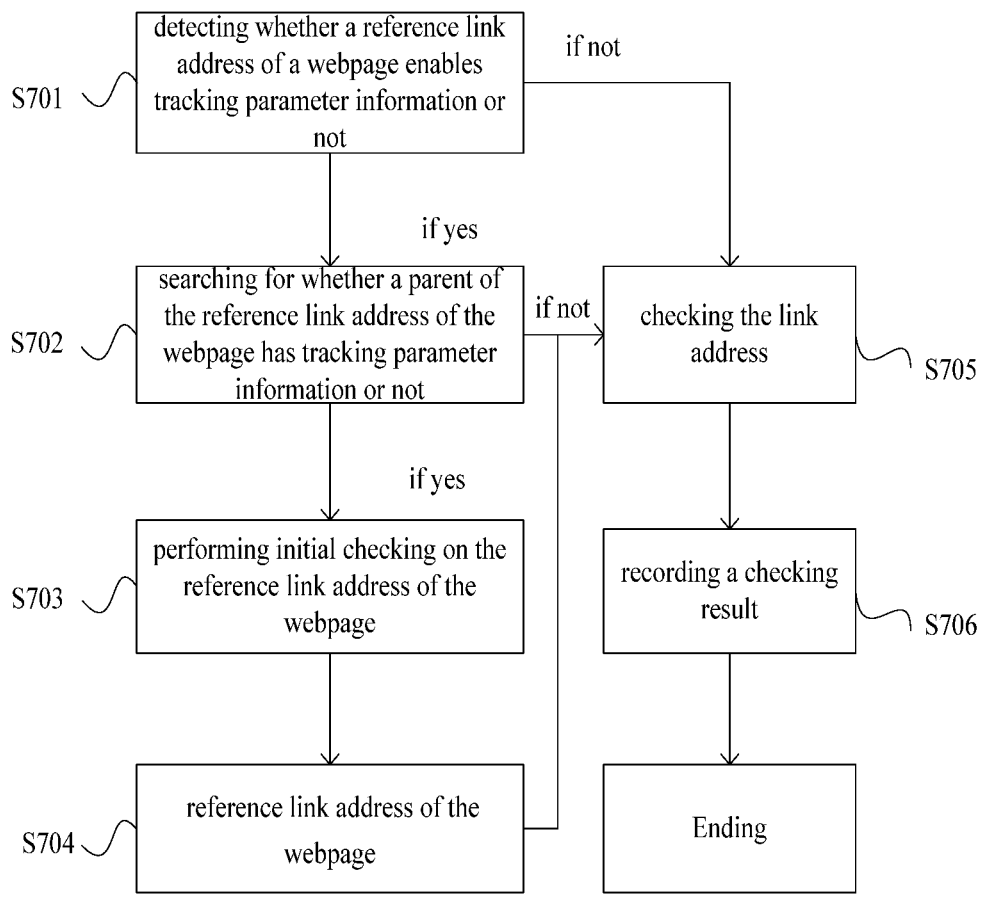
FIG. 7 is a flowchart of adding a parameter to a link address according to an embodiment of the disclosure.

FIG. 7 is a flowchart of adding a parameter to a link address according to an embodiment of the disclosure. A method for adding a parameter to a link address of an advertisement according to the embodiment of the disclosure includes the following Step 701 to Step 706.

Step 701: detecting whether the link address of the advertisement enables tracking parameter information or not.

Before the parameter is added to the link address, a detection module detects whether the link address of the advertisement enables the tracking parameter information or not at first, and whether a parent of the link address of the advertisement has tracking parameter information or not is searched if the tracking parameter information is enabled; and if the tracking parameter information is not enabled, Step 705 is executed, and a checking module checks whether the link address of the advertisement is correct or not. Wherein, checking whether the link address of the advertisement is correct or not is to check whether the link address, which does not enable the tracking parameter information, of the advertisement is the same as an original link address content of the advertisement or not, and if the link address is the same as the original link address content, Step 706 is executed and a checking result is recorded; and if the link address is different from the original link address content, Step 702 is executed and a checking result is recorded.

Preferably, the tracking parameter information is set if an advertisement material is added. When the tracking parameter information is required to be enabled, the tracking parameter information is searched, and first checking processing is performed, wherein first checking processing may be marking existing information in the link address. However, the parent of the link address is checked whether to have tracking parameter information or not under the condition that no tracking parameter information is set, and if the parent of the link address has the tracking parameter information, the tracking parameter is added according to the tracking parameter information of the parent and the link address of the advertisement.

Step 702: searching for whether the parent of the link address of the advertisement has the tracking parameter information or not.

If the link address of the advertisement enables the tracking parameter information, whether the parent of the link address of the advertisement has the tracking parameter information or not is searched. If the tracking parameter information of the parent of the link address of the advertisement is searched, the tracking parameter information of the parent is employed as the tracking parameter information of the link address of the advertisement. If the parent of the link address of the advertisement does not have the tracking parameter information, Step 705 is executed, and the link address of the advertisement is checked. Whether the link address of the advertisement after searching is the same as the link address content of the advertisement before searching or not is checked, and if the link address is the same as the link address content, Step 706 is executed and a checking result is recorded; and if the link address is different from the link address content, Step 702 is executed and a checking result is recorded.

Step 703: performing first checking processing on the link address of the advertisement.

First checking processing is performed on the link address, of which the tracking parameter information of the parent is searched, of the advertisement, and first checking processing is marking the existing parameter information. After the existing parameter information is marked, in a process of adding the tracking parameter to the link address or modifying the tracking parameter, the existing parameter information and the added or modified tracking parameter information may be conveniently distinguished and the parameter to be added or modified may be accurately positioned to avoid repeated parameter information addition or tracking parameter information modification errors.

Step 704: adding or modifying the tracking parameter of the link address of the advertisement.

The tracking parameter of the link address is added or modified according to the tracking parameter and the link address of the advertisement after first checking processing of the link address, wherein the tracking parameter is a series of key values, and a value of each tracking parameter may be a fixed constant or a variable represented by a wildcard. When the value of the added tracking parameter is the variable represented by the wildcard, the wildcard in the tracking parameter is automatically converted into a corresponding value of the variable in a process of adding the parameter to the link address of the advertisement; and when the value of the added tracking parameter is the fixed constant, the fixed constant is directly added to the link address of the advertisement.

When the tracking parameter information corresponding to the link address of the advertisement is changed or the value of the variable represented by the wildcard is changed, the original tracking parameter may be replaced with the tracking parameter in the modified tracking parameter information.

After the parameter is added to the link address of the advertisement, Step 705 is executed.

The tracking parameter may take a certain related attribute of a material as the parameter value, such as a unit name, a plan name, a solution name and an account name. Since the related attribute of the material is directly related to material information, setting the related attribute of the material as the parameter value of the tracking parameter may bring more convenience to management of the tracking parameter.

Step 705: checking the link address.

The link address is checked by the detection module. For a link address, of which a tracking parameter is not added and modified, of an advertisement, whether the link address is the same as an original link address content of the advertisement or not is checked; and for a link address, to which a tracking parameter is added, of an advertisement, whether a tracking parameter of an obtained link address is completed or not is checked, whether a value of the obtained link address is correct or not is checked and whether a length of the obtained link address is excessive or not is checked.

If the tracking parameter of the second link address is not completed, the value of the second link address is incorrect or the length of the second link address is excessive, whether the first link address enables the tracking parameter information or not is rechecked; and if the tracking parameter of the second link address has been completed, the value of the second link address is correct and the length of the second link address is not excessive, a checking result is recorded. After checking, Step 706 is executed, and the checking result is recorded.

Step 706: recording the checking result.

Recording the checking result includes recording a correct link address and a wrong link address, the link address is submitted if the link address is correct, and whether to add the tracking parameter or not is rechecked if the link address is incorrect.

The above is only the preferred embodiment of the invention and not intended to limit the present invention. Those skilled in the art may make various modifications and variations to the invention. Any modifications, equivalent replacements, improvements and the like made within the spirit and principle of the present invention shall fall within the scope of protection of the present invention.

What is claimed is:

1. A link address updating method, comprising:
acquiring tracking parameter information, wherein the tracking parameter information is parameter information of a first link address, and is configured to track the first link address;
acquiring the first link address; and
generating a second link address according to the tracking parameter information and the first link address, the second link address is a link address obtained after a tracking parameter of the first link address is added or modified, wherein both the first link address and the second link address are link addresses of the same webpage,
wherein, before generating the second link address according to the tracking parameter information and the first link address, further comprising:
detecting whether the first link address enables the tracking parameter information or not;
if the first link address enables the tracking parameter information, searching for whether the parent of the first link address has tracking parameter information or not, wherein searching for whether the parent of the first link address has the tracking parameter information or not comprises:
performing first checking processing on the first link address if the parent of the first link address has the tracking parameter information, first checking processing being marking the existing parameter information in the first link address, and
performing second checking processing on a searched first link address content if the parent of the first link address does not have the tracking parameter information; and
if the first link address does not enable the tracking parameter information, performing second checking on a detected first link address content, and recording a checking result.

2. The link address updating method according to claim 1, wherein a value of the tracking parameter is a fixed constant or a variable represented by a wildcard, wherein generating the second link address according to the tracking parameter information and the first link address comprises:

generating the second link address according to the fixed constant and the first link address, or
generating the second link address according to the variable represented by the wildcard and the first link address.

3. The link address updating method according to claim 2, wherein generating the second link address according to the tracking parameter information and the first link address comprises: adding the tracking parameter information to the first link address, wherein adding the tracking parameter information to the first link address comprises:
judging whether the value of the tracking parameter is the fixed constant or not;
adding the fixed constant to the first link address if the value of the tracking parameter is the fixed constant; and
if the value of the tracking parameter is the variable represented by the wildcard, converting the variable represented by the wildcard into a corresponding value of the variable, and adding the value of the variable to the first link address.

4. The link address updating method according to claim 1, wherein performing second checking processing on the searched first link address content comprises:
if the searched first link address content is the same as a first link address content, recording the checking result; and
if the searched first link address content is different from the first link address content, rechecking whether the first link address enables the tracking parameter information or not.

5. The link address updating method according to claim 1, further comprising: after first checking processing of the first link address, adding or modifying the tracking parameter information of the first link address to obtain the second link address.

6. The link address updating method according to claim 1, wherein whether the first link address enables the tracking parameter information or not is rechecked if the tracking parameter information or the first link address is changed, wherein
the tracking parameter information of the parent is searched if the tracking parameter information is enabled, and
second checking is performed on the first link address content if the tracking parameter information is not enabled.

7. The link address updating method according to claim 1, wherein link address checking is performed on the second link address after the second link address is generated according to the tracking parameter information and the first link address, wherein link address checking is performed on the second link address in a manner of:
checking whether a tracking parameter of the second link address is completed or not,
checking whether a value of the second link address is correct or not; and
checking whether a length of the second link address is excessive or not;
if the tracking parameter of the second link address is not completed, the value of the second link address is incorrect or the length of the second link address is excessive, whether the first link address enables the tracking parameter information or not is rechecked; and
if the tracking parameter of the second link address has been completed, the value of the second link address is correct and the length of the second link address is not excessive, a checking result is recorded.

8. A link address updating device, comprising:

a first acquisition module, configured to acquire tracking parameter information, wherein the tracking parameter information is parameter information of a first link address, and is configured to track the first link address;

a second acquisition module, configured to acquire the first link address; and a generation module, configured to generate a second link address according to the tracking parameter information and the first link address, the second link address is a link address obtained after a tracking parameter of the first link address is added or modified, wherein both the first link address and the second link address are link addresses of the same webpage, wherein, a detection module, configured to detect whether the first link address enables the tracking parameter information or not before the second link address is generated according to the tracking parameter information and the first link address;

a searching module, configured to, if the first link address enables the tracking parameter information, search for whether a parent of the first link address has tracking parameter information or not, wherein searching for whether the parent of the first link address has the tracking parameter information or not comprises: performing first checking processing on the first link address if the parent of the first link address has the tracking parameter information, first checking processing being marking the existing parameter information in the first link address, and performing second checking processing on a searched first link address content if the parent of the first link address does not have the tracking parameter information; and a checking module, configured to, if the first link address does not enable the tracking parameter information, perform second checking on a detected first link address content, and record a checking result.

9. The link address updating device according to claim 8, wherein a value of the tracking parameter is a fixed constant or a variable represented by a wildcard, wherein the generation module is configured to generate the second link address according to the tracking parameter information and the first link address in a manner of:

generating the second link address according to the fixed constant and the first link address, or generating the second link address according to the variable represented by the wildcard and the first link address.

10. The link address updating device according to claim 9, wherein the generation module is configured to generate the second link address according to the tracking parameter information and the first link address by adding the tracking parameter information to the first link address, and the generation module comprises:

a judgment sub-module, configured to judge whether the value of the tracking parameter is the fixed constant or not;

a first addition sub-module, configured to add the fixed constant to the first link address if the value of the tracking parameter is the fixed constant; and a second addition sub-module, configured to, if the value of the tracking parameter is the variable represented by the wildcard, convert the variable represented by the wildcard into a corresponding value of the variable, and add the value of the variable to the first link address.

* * * * *